United States Patent
Tanaka et al.

(10) Patent No.: US 11,768,213 B2
(45) Date of Patent: Sep. 26, 2023

(54) REAGENT CONTAINER

(71) Applicant: SYSMEX CORPORATION, Kobe (JP)

(72) Inventors: Hironori Tanaka, Kobe (JP); Seiji Hamano, Kobe (JP); Masato Kuze, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 245 days.

(21) Appl. No.: 17/130,075

(22) Filed: Dec. 22, 2020

(65) Prior Publication Data
US 2021/0199681 A1 Jul. 1, 2021

(30) Foreign Application Priority Data
Dec. 27, 2019 (JP) .................................. 2019-238827

(51) Int. Cl.
*C12N 15/10* (2006.01)
*B01L 3/00* (2006.01)
(Continued)

(52) U.S. Cl.
CPC ............ *G01N 35/1002* (2013.01); *B01L 3/52* (2013.01); *B01L 3/561* (2013.01); *B01L 2200/026* (2013.01)

(58) Field of Classification Search
CPC ........... G01N 35/1002; G01N 15/1459; G01N 35/1095; G01N 2015/0073; G01N 2015/0076; G01N 2015/008; G01N 2015/0084; G01N 2015/1006; G01N 35/00; G01N 2035/00178; G01N 2035/00326;
(Continued)

(56) References Cited

U.S. PATENT DOCUMENTS 9,377,477 B2  6/2016 Nagai et al.
10,031,151 B2  7/2018 Nagai et al.
(Continued)

FOREIGN PATENT DOCUMENTS

JP   H08-133336 A   5/1996
JP   2004-226314 A   8/2004
(Continued)

OTHER PUBLICATIONS

An extended European search report dated Sep. 16, 2021 in a counterpart European patent application.
A partial European search report dated Jun. 16, 2021 in a counterpart European patent application.
An Office Action "JPOA" dated Jun. 27, 2023 in a counterpart Japanese patent application.

*Primary Examiner* — Jennifer Wecker
*Assistant Examiner* — Oyeleye Alexander Alabi
(74) *Attorney, Agent, or Firm* — METROLEX IP LAW GROUP, PLLC

(57) ABSTRACT

A reagent container is disclosed that is installed in an analyzer for use and stores a reagent supplied to the analyzer via an aspiration tube. The reagent container includes a container body. The container body includes a tubular member with an opening into which the aspiration tube is inserted from above, and a bag-shaped member joined to the tubular member and storing the reagent. The container body comprises a penetration prevention member that prevents a tip of the aspiration tube 90 inserted through the opening from penetrating the container body.

19 Claims, 10 Drawing Sheets

(51) Int. Cl.

| | |
|---|---|
| *G01N 21/3504* | (2014.01) |
| *G01N 33/00* | (2006.01) |
| *G01N 33/574* | (2006.01) |
| *G01N 21/64* | (2006.01) |
| *A61K 45/06* | (2006.01) |
| *G01N 21/35* | (2014.01) |
| *G01N 33/50* | (2006.01) |
| *G01N 35/10* | (2006.01) |

(58) Field of Classification Search
CPC ...... B01L 3/52; B01L 3/561; B01L 2200/026; B01L 3/505; B01L 2300/0832; B01L 2300/0851; B01L 2300/123; B01L 2400/049

See application file for complete search history.

(56) References Cited

U.S. PATENT DOCUMENTS

| | | |
|---|---|---|
| 2015/0361488 A1 | 12/2015 | Schultz et al. |
| 2016/0187364 A1* | 6/2016 | Yaginuma ............... B01L 3/523 422/501 |
| 2016/0296936 A1 | 10/2016 | Trump et al. |
| 2021/0130891 A1* | 5/2021 | Schultz ................. B01F 31/311 |

FOREIGN PATENT DOCUMENTS

| | | |
|---|---|---|
| JP | 5810233 B2 | 11/2015 |
| JP | 5810245 B1 | 11/2015 |
| JP | 2016-090527 A | 5/2016 |
| JP | 2017-521061 A | 8/2017 |

* cited by examiner

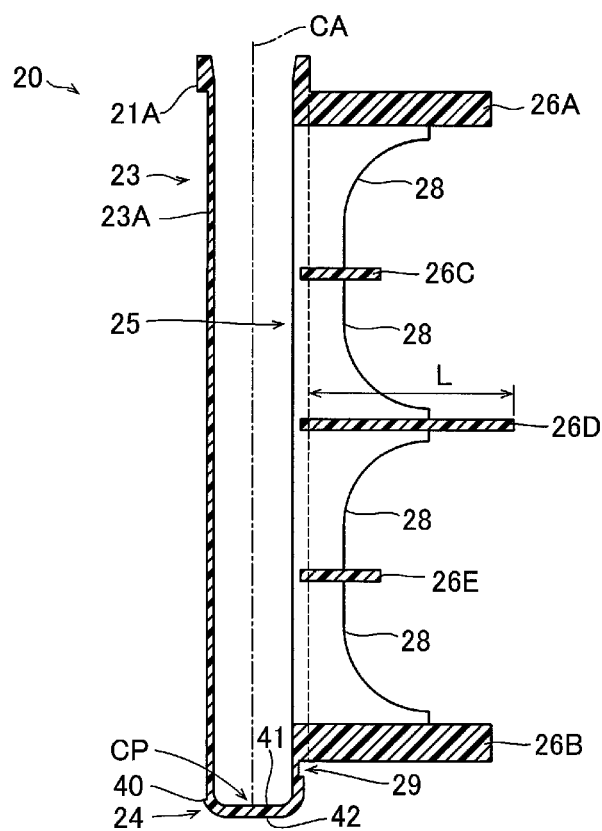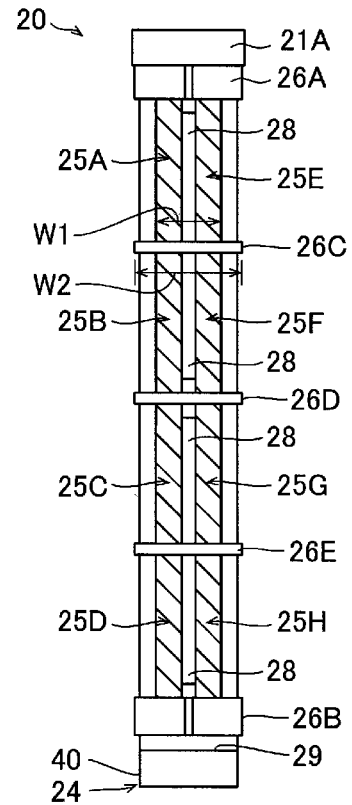

REAGENT CONTAINER

CROSS REFERENCE TO RELATED APPLICATIONS

This application claims priority to prior Japanese Patent Application No. 2019-238827 filed with the Japan Patent Office on Dec. 27, 2019, the entire contents of which are incorporated herein by reference.

BACKGROUND

The disclosure relates to a reagent container storing a reagent used in an analyzer.

Japanese Patent Application Publication No. 2004-226314 (hereinafter, Patent Document 1) discloses a reagent container 900 including a reagent storage pouch 901, as illustrated in FIG. 16. The reagent storage pouch 901 has a bag-shaped member 902 storing a reagent therein, and a tubular reagent takeout member 903 attached to the bag-shaped member 902. The reagent takeout member 903 includes a nozzle insertion port 904, and the nozzle insertion port 904 is used to insert the sample aspiration nozzle of the automatic analyzer into the bag-shaped member 902.

In Patent Document 1 mentioned above, the bag-shaped member 902 is configured to have flexibility by a synthetic resin film such as nylon or polypropylene in order to suppress the oxidation of the reagent stored therein. In this case, when the aspiration tube (nozzle) of the analyzer is inserted through the nozzle insertion port 904 into the reagent container 100, the tip of the aspiration tube having passed through the reagent takeout member 903 may come into contact with the inner bottom of the bag-shaped member 902. When the tip of the aspiration tube comes into contact with the inner bottom of the bag-shaped member 902, the tip of the aspiration tube may penetrate the bag-shaped member 902. If the tip of the aspiration tube penetrates the bag-shaped member 902, it may cause liquid leakage of the reagent.

In particular, in the analyzer, there may be a case where the reagent container has a nozzle insertion port covered with a sealing material, and the aspiration tube pierces the sealing material so that the aspiration tube is inserted into the reagent container. In that case, a hard tube member with a sharp tip may be employed for the aspiration tube in order to ensure the piercing performance, and the contact between the tip of the aspiration tube and the inner bottom of the bag-shaped member increases the risk that the tip of the aspiration tube could penetrate the bag-shaped member.

SUMMARY

A reagent container installed in an analyzer for use, and that stores a reagent supplied to the analyzer via an aspiration tube according to one or more embodiments may include: a container body including a tubular member with an opening into which the aspiration tube is inserted from above, and a bag-shaped member joined to the tubular member and storing the reagent. The container body may include a penetration prevention member that prevents a tip of the aspiration tube inserted through the opening from penetrating the container body.

A reagent container installed in an analyzer for use, and that stores a reagent supplied to the analyzer via an aspiration tube according to one or more embodiments may include: a container body including a tubular member with an opening into which the aspiration tube is inserted, and a bag-shaped member joined to the tubular member and storing the reagent. An inner bottom of the bag-shaped member is arranged with a distance from a part of an inner bottom of the container body which a tip of the aspiration tube inserted through the opening faces.

BRIEF DESCRIPTION OF DRAWINGS

FIG. 9A is a vertical cross-sectional diagram illustrating the tubular member, and FIG. 9B is a diagram illustrating a side view from the side opening thereof;

DETAILED DESCRIPTION

Figure 1:
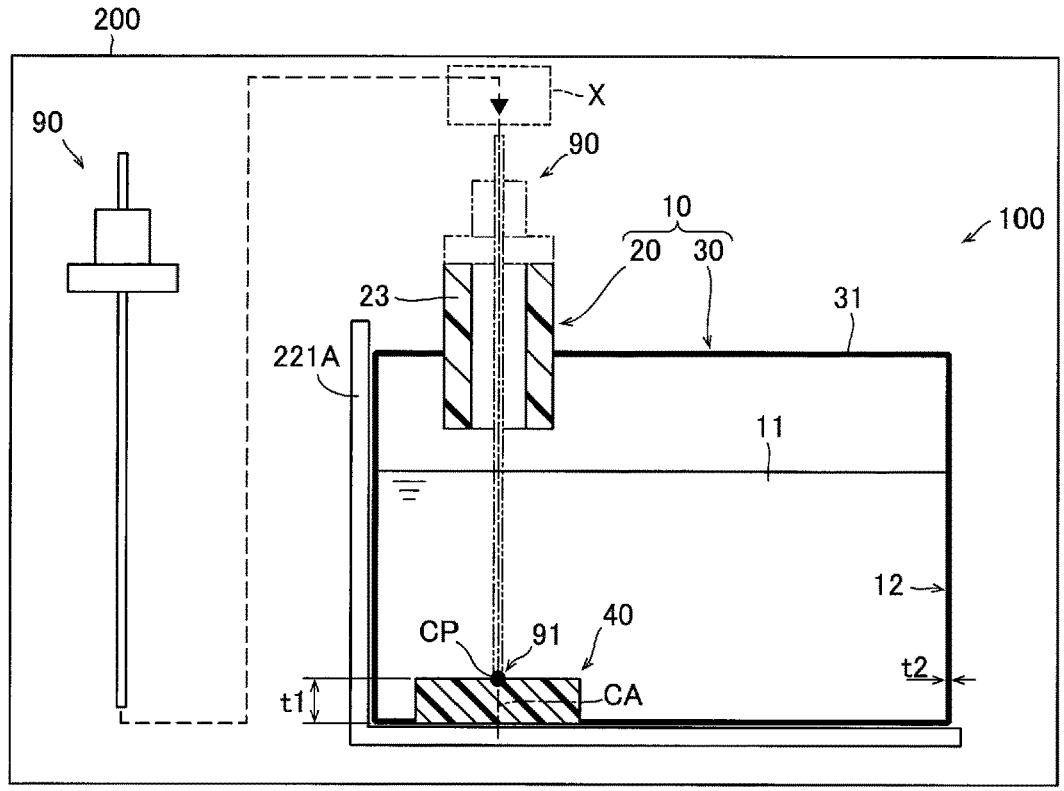
FIG. 1 is a schematic cross-sectional diagram illustrating an outline of a reagent container installed in an analyzer.

In the reagent container according to one or more embodiments, the container body (10) includes a penetration prevention member (40) that prevents the tip (91) of the aspiration tube (90) inserted from above the opening from penetrating the container body (10). As a result, when the tip (91) of the aspiration tube (90) inserted into the container body (10) through the opening comes into contact with the inner bottom of the container body (10), the tip (91) of the aspiration tube (90) comes into contact with and is received by the penetration prevention member (40) instead of the bag-shaped member (30). As a result, even in the case of using a reagent container (100) including a bag-shaped member (30) storing a reagent (11), it is possible to avoid contact between the tip (91) of the aspiration tube (90) and the bag-shaped member (30). Therefore, it is possible to suppress the tip (91) of the aspiration tube (90) of the analyzer from penetrating the container body (10).

In the reagent container according to one or more embodiments, the inner bottom of the bag-shaped member (30) is arranged at a position off the lower side where the tip (91) of the aspiration tube (90) inserted through the opening is arranged. As a result, even in the case of using a reagent container (100) including a bag-shaped member (30) storing a reagent (11), it is possible to avoid contact between the tip (91) of the aspiration tube (90) and the bag-shaped member (30). Therefore, it is possible to suppress the tip (91) of the aspiration tube (90) of the analyzer (200) from penetrating the container body (10).

One or more embodiments may suppress the tip of the aspiration tube from penetrating the container body due to contact with the aspiration tube of the analyzer.

Hereinafter, embodiments are described with reference to the drawings.

[Outline of Reagent Container]

First, the outline of a reagent container 100 according to an embodiment is described with reference to FIGS. 1 and 2.

FIG. 1 is a schematic cross-sectional diagram illustrating an outline of the reagent container 100 installed in an analyzer 200. The reagent container 100 is a reagent container that internally stores the reagent 11 used for sample analysis. The reagent container 100 is a container capable of storing a liquid. The reagent container 100 is a reagent container that is installed in the analyzer 200 and stores the reagent 11 supplied to the analyzer 200 via the aspiration tube 90. The analyzer 200 includes a reagent placement unit 221A on which the reagent container 100 can be placed. The reagent container 100 is placed on and held by the reagent placement unit in a predetermined placement posture. The analyzer 200 is an automatic analyzer that acquires the reagent 11 in the reagent container 100 and analyzes a sample using the acquired reagent 11.

The sample can be a substance of biological origin. The sample contains a test substance. When the sample is added and reacted with a reagent, a specimen for measuring the test substance is prepared. The subject is mainly human, but may be an animal other than human. The analyzer 200 performs analysis for clinical examination or medical research of, for example, a sample collected from a patient. The sample of biological origin is, for example, a liquid collected from the subject such as blood (whole blood, serum, or plasma) or urine, a liquid obtained by subjecting the collected liquid to a predetermined pretreatment, or the like. In addition, the sample may be, for example, a part of the tissue of the subject or cells other than the liquid. The analyzer 200 detects a test substance contained in the sample. The test substance may contain, for example, a predetermined component, cells, or formed components in a blood or urine sample. The test substance may be a nucleic acid such as DNA (deoxyribonucleic acid), a cell or intracellular substance, an antigen or an antibody, a protein, a peptide, or the like.

The analyzer 200 can aspirate the reagent 11 from the inside of the reagent container 100 by using an aspiration tube 90 or the like. The reagent container 100 stores the reagent 11 in an amount that allows a predetermined number of sample analyses. The reagent container 100 can be a disposable container that is discarded when almost the entire amount of the reagent 11 being stored is aspirated.

The reagent 11 is a liquid. The reagent 11 is, for example, an aqueous solution containing components corresponding to the analysis items by sample analysis. When mixed with a sample in the analyzer 200, the reagent 11 contains, for example, a component that reacts with a component contained in the sample. The reagent 11 contains, for example, a component that labels a test substance contained in the sample.

The reagent container 100 includes at least a container body 10 including a tubular member 20, a bag-shaped member 30, and a penetration prevention member 40. The tubular member 20, the bag-shaped member 30, and the penetration prevention member 40 are separate parts formed separately from each other. The tubular member 20 and the bag-shaped member 30 are integrated by being joined. In addition, the penetration prevention member 40 and the bag-shaped member 30 are integrated by being joined.

The tubular member 20 includes a tubular shape with a hollow inside. The tubular member 20 is a member that communicates the inside and the outside of the container body 10 and serves as an entrance/exit of the aspiration tube 90.

The tubular member 20 includes openings into which the aspiration tube 90 is inserted. In the example of FIG. 1, the openings communicate with each other inside the tubular member 20. The tubular member 20 includes a peripheral wall portion 23 that partitions the openings. In the example of FIG. 1, the tubular member 20 extends linearly in the vertical direction. The tubular member 20 has, for example, a cylindrical shape (see FIG. 2). The tubular member 20 may have a square tubular shape other than a cylindrical shape. Here, the term "from above" indicates a position above the upper end surface of the tubular member 20 having openings into which the aspiration tube 90 is inserted. In other words, "from above" includes a region X just above the opening into which the tip 91 of the aspiration tube 90 is inserted.

The bag-shaped member 30 is a bag-shaped container portion that stores the reagent 11. The bag-shaped member 30 is formed in a bag shape by a sheet-shaped or film-shaped material. The bag-shaped member 30 is a flexible bag-shaped liquid container. The bag-shaped member 30 is formed in a bag shape, for example, by joining the inner surfaces of the outer peripheral portions of one folded sheet-shaped member 31 to each other. In addition, as illustrated in FIG. 2, for example, the bag-shaped member 30 is formed in a bag shape by stacking sheet-shaped members 31 and joining the region BR1 along the peripheral edge of the stacked sheet-shaped members 31 to each other.

In addition, the bag-shaped member 30 is joined to the tubular member 20. In the examples of FIGS. 1 and 2, the bag-shaped member 30 is joined in a region BR2 that surrounds the periphery of the tubular member 20 along the outer peripheral surface of the tubular member 20. By joining, the openings of the tubular member 20 and the internal space of the bag-shaped member 30 communicate with each other. The internal space of the bag-shaped member 30 communicates with the outside of the container body 10 through the openings of the tubular member 20. By joining, the container body 10 communicates with the outside only at the openings of the tubular member 20.

Figure 2:
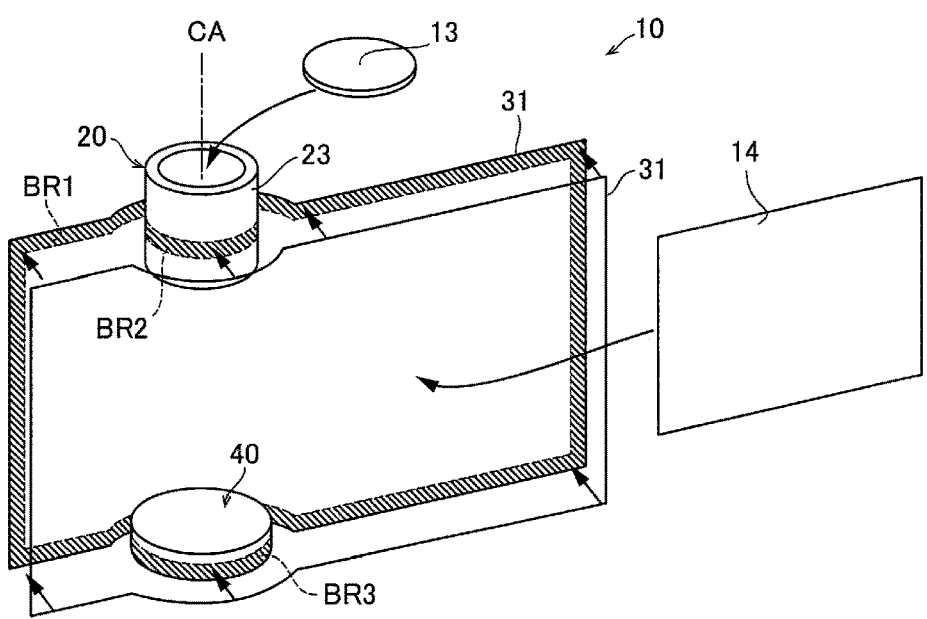
FIG. 2 is a diagram illustrating a structural example of the reagent container of FIG. 1.

The opening of the tubular member 20 can be sealed by the sealing material 13 (see FIG. 2). When penetrated by the aspiration tube 90, the sealing material 13 allows aspiration of the reagent 11 from the inside of the reagent container 100 through the openings. The sealing material 13 may be removed from the container body 10 when, for example, the reagent container 100 is used. The sealing material 13 may be repeatedly attached and detached at a position covering the opening of the tubular member 20.

The bag-shaped member 30 may include a reagent identification member 14 on the outer surface thereof (see FIG. 2), such as an RFID (radio frequency identifier) tag or a display label that stores information about the reagent.

As illustrated in FIG. 1, when the analyzer 200 aspirates the reagent 11, the aspiration tube 90 is inserted through the opening of the tubular member 20 to access the reagent 11 inside the container body 10 from the outside of the container body 10. The aspiration tube 90 is, for example, a thin hollow tubular member extending linearly. The upper end of the aspiration tube 90 is connected to the fluid circuit of the analyzer 200 and is held by the analyzer 200. The aspiration tube 90 enters the inside of the opening of the tubular member 20 from the outside of the container body 10 along the central axis CA of the tubular member 20. The aspiration tube 90 aspirates the reagent 11 from the tip 91 by being supplied with an aspiration force by the analyzer 200.

In order to reduce the dead volume of the reagent 11, the dimensions of the container body 10 suitable for the analyzer 200 are designed so that the tip 91 of the aspiration tube 90 having penetrated into the container body 10 is as close as possible to the inner bottom of the container body 10. Note that the dead volume is the residual amount of the reagent 11 that cannot be aspirated by the aspiration tube 90 and remains in the reagent container 100. The tip 91 of the aspiration tube 90 is designed so as not to come into contact with the bottom portion of the container body 10, but the tip 91 may come into contact with the bottom portion in consideration of dimensional error and the like.

Therefore, in the present embodiment, the container body 10 includes a penetration prevention member 40 that prevents the tip 91 of the aspiration tube 90 from penetrating the container body 10. The penetration prevention member 40 is arranged below the tip 91 of the aspiration tube 90 inserted through the opening of the tubular member 20. Here, "below the tip of the aspiration tube" means below the tip 91 of the aspiration tube 90 having moved to the inner bottom side of the container body 10 along the central axis CA of the tubular member 20.

In the example of FIG. 1, the penetration prevention member 40 constitutes a part of the inner surface 12 of the container body 10. The container body 10 includes the penetration prevention member 40 in a bottom portion region including an intersection CP between the central axis CA of the opening of the tubular member 20 and the inner surface 12 of the container body 10. The shape of the penetration prevention member 40 is not particularly limited. In the example of FIG. 1, the penetration prevention member 40 has a flat plate shape. In the example of FIG. 2, the penetration prevention member 40 has a disk shape corresponding to the shape of the opening of the tubular member 20. In the example of FIG. 2, the bag-shaped member 30 is joined in a region BR3 (see FIG. 2) that surrounds the periphery of the penetration prevention member 40 along the outer peripheral surface of the penetration prevention member 40. Therefore, the lower surface portion of the penetration prevention member 40 forms a part of the outer surface of the container body 10. The penetration prevention member 40 may be joined to the inner bottom of the bag-shaped member 30 inside the bag-shaped member 30.

In the example of FIG. 1, the width of the penetration prevention member 40 in the direction intersecting the moving direction of the aspiration tube 90 is larger than the width of the opening of the tubular member 20 in consideration of the movement of the aspiration tube 90 and the variation in the position of the tip 91. The penetration prevention member 40 may be formed over a larger area, for example, the entire inner bottom of the bag-shaped member 30.

When the aspiration tube 90 enters the inside of the container body 10 via the tubular member 20, the tip 91 of the aspiration tube 90 may come into contact with the penetration prevention member 40. Therefore, the tip 91 of the aspiration tube 90 is suppressed from penetrating the bag-shaped member 30. The penetration prevention member 40 is configured so that it does not penetrate even if it comes into contact with the tip 91 of the aspiration tube 90. Therefore, even if the tip 91 of the aspiration tube 90 comes into contact, the reagent container 100 is prevented from penetrating.

As described above, in the reagent container 100 according to the present embodiment, the container body 10 includes a penetration prevention member 40 that prevents the tip 91 of the aspiration tube 90 inserted from above the opening of the tubular member 20 from penetrating the container body 10. As a result, when the tip 91 of the aspiration tube 90 inserted into the container body 10 through the opening of the tubular member 20 is about to come into contact with the inner surface 12 of the container body 10, the tip 91 of the aspiration tube 90 comes into contact with the penetration prevention member 40 instead of the bag-shaped member 30 and is received. As a result, even in the case of using the reagent container 100 including the bag-shaped member 30 storing the reagent 11, it is possible to avoid contact between the tip 91 of the aspiration tube 90 and the bag-shaped member 30.

Further, as illustrated in FIG. 1, in the configuration in which the penetration prevention member 40 is provided in the bottom portion region including the intersection CP between the central axis CA of the opening of the tubular member 20 and the inner surface 12 of the container body 10, the aspiration tube 90 entering the inside of the container body 10 along the central axis CA is more reliably received by the penetration prevention member 40. In addition, since the penetration prevention member 40 is arranged in the bottom portion region, the tip 91 of the aspiration tube 90 can be arranged at a position as close as possible to the inner bottom of the container body 10. Therefore, it is possible to reduce the dead volume of the reagent 11.

In addition, in the example of FIG. 1, the penetration prevention member 40 is locally formed in the bottom portion region including the intersection CP on the inner surface 12 of the container body 10. Therefore, it is not necessary to provide the penetration prevention member 40 in a large area of the inner surface 12 of the container body 10. Hence, it is possible to prevent the tip 91 of the aspiration tube 90 from penetrating the container body 10 while maintaining the flexibility of the bag-shaped member 30.

Note that, in the manufacture of the reagent container 100, a predetermined amount of the reagent 11 is dispensed into the container body 10, the air layer inside is eliminated, and the sealing material 13 is joined to the upper surface of the opening of the tubular member 20. In order to eliminate the air in the container body 10, preferably, the air in the container body 10 is replaced with an inert gas. That is, the gas phase region inside the container body 10 can be filled with an inert gas. As the inert gas, for example, argon, helium, neon, nitrogen, or the like can be employed.

Other Embodiments of Reagent Container

In the present embodiment, the reagent container 100 may have the following configuration.

The reagent container 100 illustrated in FIG. 1 is a reagent container that is installed in the analyzer 200 and stores the reagent 11 supplied to the analyzer 200 via the aspiration tube 90, including the container body 10 that includes the tubular member 20 with an opening into which the aspiration tube 90 is inserted, and that includes the bag-shaped member 30 joined to the tubular member 20 and storing the reagent 11. The inner bottom of the bag-shaped member 30 is arranged at a position off the lower side where the tip 91 of the aspiration tube 90 inserted through the opening is arranged.

That is, in the example of FIG. 1, the bag-shaped member 30 is not arranged below the tip 91 of the aspiration tube 90 inserted through the opening of the tubular member 20. The bag-shaped member 30 is arranged in a region other than the lower position where the tip 91 of the aspiration tube 90 inserted through the opening of the tubular member 20 is arranged.

As described above, in a reagent container 100 according to another embodiment, the inner bottom of the bag-shaped member 30 is arranged at a position off the lower side where the tip 91 of the aspiration tube 90 inserted through the opening of the tubular member 20 is arranged. As a result, even in the case of using the reagent container 100 including the bag-shaped member 30 storing the reagent 11, it is possible to avoid contact between the tip 91 of the aspiration tube 90 and the bag-shaped member 30. Therefore, it is possible to suppress the tip 91 of the aspiration tube 90 of the analyzer 200 from penetrating the container body 10.

(Constituent Materials of Container Body)

The container body 10 has a gas barrier property as a whole. The gas barrier property is a property that makes it difficult for gas to permeate. As used herein, the gas barrier property refers to how difficult it is for air, especially oxygen, to permeate. As a result, it is possible to prevent the reagent 11 stored in the reagent container 100 from being deteriorated by the outside air. The container body 10 has a light-shielding property. The light-shielding property is a property that makes it difficult for light to transmit. As a result, it is possible to suppress the reagent 11 stored in the reagent container 100 from being deteriorated by external light such as sunlight.

<Tubular Member>

The tubular member 20 has a gas barrier property and a light-shielding property. The tubular member 20 is a molded product made of a resin material. The resin material constituting the tubular member 20 is, for example, a thermoplastic resin, specifically polyethylene (PE). The resin material constituting the tubular member 20 may be polypropylene (PP), polyethylene terephthalate (PET), or the like.

<Bag-Shaped Member>

The bag-shaped member 30 has a gas barrier property. The bag-shaped member 30 has a higher gas barrier property than the tubular member 20. The bag-shaped member 30 has a light-shielding property. The bag-shaped member 30 is formed of, for example, a sheet-shaped member 31 with a gas barrier property and a light-shielding property. Specifically, the bag-shaped member 30 is made of a laminated structure film material with a gas barrier property and a light-shielding property as the sheet-shaped member 31. This makes it possible to suppress the deterioration of the reagent 11 due to the outside air, and suppress the deterioration of the reagent 11 due to the external light. Therefore, the quality of the reagent 11 can be maintained for a longer period of time.

Figure 3A:
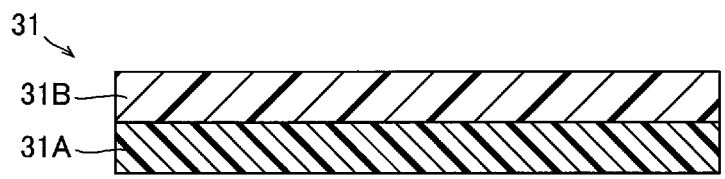
FIGS. 3A and 3B are diagrams each illustrating a configuration example of a sheet-shaped member.
Figure 3B:
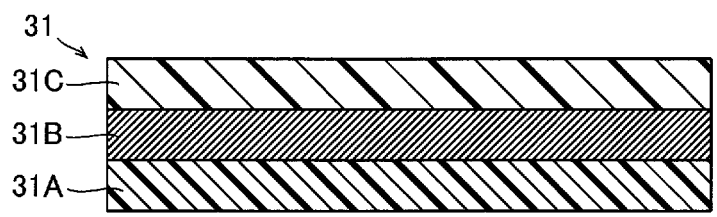

The laminated structure film material includes various film materials so-called "gas barrier films". As illustrated in FIG. 3A, the laminated structure film material may typically include at least one base material layer 31A and at least one gas barrier layer 31B. As illustrated in FIG. 3B, the laminated structure film material may further include a protective layer 31C that protects the outer surface of the gas barrier layer 31B. The laminated structure film material may have a light-shielding layer made of a light-shielding material. When a material with both a gas barrier property and a light-shielding property is used for the gas barrier layer 31B, the gas barrier layer 31B and the light-shielding layer can be the same layer. The number of layers of the laminated structure film material is 2 or more, but may be 3 to 9 or 10 or more, and is not particularly limited.

Examples of the laminated structure film material include a metal foil laminated film, a resin-based multilayer barrier film, a coating-based film, a vapor-deposited film, and an organic-inorganic composite film. The metal foil laminated film is a film having a structure in which a gas barrier layer made of a metal foil such as an aluminum foil is laminated on a resin base material layer. The resin-based multilayer barrier film is a film having a structure in which resin material layers with an excellent gas barrier property are laminated. The resin material with an excellent gas barrier property may be, for example, PVDC (polyvinylidene chloride), PVA (polyvinyl alcohol), EVOH (ethylene-vinyl alcohol copolymer), and the like. The coating-based film is a film having a structure in which a base material layer is coated (film-formed) with a gas barrier material. The gas barrier material to be film-formed is PVDC, PVA, EVOH, or the like, and can be formed by a wet process such as coating. The vapor-deposited film is a film having a structure in which a gas barrier material is vapor-deposited on a base material layer. The gas barrier material to be vapor-deposited is a metal such as aluminum, or an inorganic oxide such as alumina or silica. The gas barrier material can also be formed by a dry process in which a deposition treatment other than vapor deposition is performed. The organic-inorganic composite film includes a laminated film having a structure in which a gas barrier layer made of an organic (resin) material and a gas barrier layer made of an inorganic material are separately laminated, a film including a gas barrier layer in which an inorganic material is dispersed in an organic binder, and the like.

The laminated structure film material used as the sheet-shaped member 31 of the bag-shaped member 30 includes an inner surface on which a base material layer 31A made of a material that can be joined to the tubular member 20 or a joint layer separate from the base material layer 31A is formed. The material that can be joined to the tubular member 20 is, for example, the same resin material as the tubular member 20. For example, both the tubular member 20 and the base material layer/joint layer are made of a thermoplastic resin such as polyethylene, and the tubular member 20 and the base material layer/joint layer are joined by heat welding.

<Penetration Prevention Member>

The constituent material of the penetration prevention member 40 is not particularly limited. The penetration prevention member 40 may be a molded product made of, for example, a resin material, as long as it is more resistant to penetration than the inner bottom of the bag-shaped member 30. The penetration prevention member 40 may be of a material or shape having a mechanical strength so that it is not penetrated even if it comes into contact with the tip 91 of the aspiration tube 90. The penetration prevention member 40 may be made of a material harder than the bag-shaped member 30. In this case, after comparison of the material constituting the penetration prevention member 40 with the material of the laminated structure film material constituting the bag-shaped member 30, the material constituting the penetration prevention member 40 is preferably the harder material. As a method of comparing the hardness of constituent materials, it is preferable to compare by a Vickers hardness test using Vickers hardness, which is one of the measures for expressing hardness. Note that, when the laminated structure film material constituting the bag-shaped member 30 is formed of a single layer, comparison is made with the Vickers hardness of the single layer, and in the case of a composite layer, comparison is made with the Vickers hardness of the layer having the maximum hardness in the composite layer. In addition, the penetration prevention member 40 may be made of a resin material having a higher density than the bag-shaped member 30. In this case, after comparison of the density of the resin material constituting the penetration prevention member 40 with the density of the resin material of the laminated structure film material constituting the bag-shaped member 30, the resin material constituting the penetration prevention member 40 is preferably the higher-density resin material. As a method of comparing the densities of resin materials, it is preferable to compare by the dimensional method, which is a method of measuring the bulk density. Note that, when the laminated structure film material constituting the bag-shaped member 30 is formed of a single layer, comparison is made with the density of the single layer, and in the case of a composite layer, comparison is made with the density of the resin material having the maximum density in the composite layer. As an example, the penetration prevention member 40 may be made of a resin material, a rubber material, or an elastomer other than rubber that does not cause mutual adverse effects against the reagent 11 stored in the bag-shaped member 30, and the penetration prevention member 40 is made of, for example, the same material as the base material layer 31A of the sheet-shaped member 31. In addition, the penetration prevention member 40 is made of, for example, the same material as the tubular member 20.

In the example illustrated in FIG. 1, the penetration prevention member 40 has a thickness t1 larger than that of the bag-shaped member 30. As a result, the mechanical strength of the penetration prevention member 40 can be increased so that it does not penetrate even if it comes into contact with the aspiration tube 90. As a result, it is possible to more reliably suppress the tip 91 of the aspiration tube 90 from penetrating the container body 10. The bag-shaped member 30 has a thickness t2. The thickness t2 is the thickness of the sheet-shaped member 31. The thickness t1 is twice or more, preferably four times or more, and more preferably eight times or more the thickness t2.

Configuration Example of Reagent Container

In the example illustrated in FIG. 1, the penetration prevention member 40 and the tubular member 20 are provided separately, and are separately joined to the bag-shaped member 30. The penetration prevention member 40 and the tubular member 20 may be formed as one part.

Figure 4:
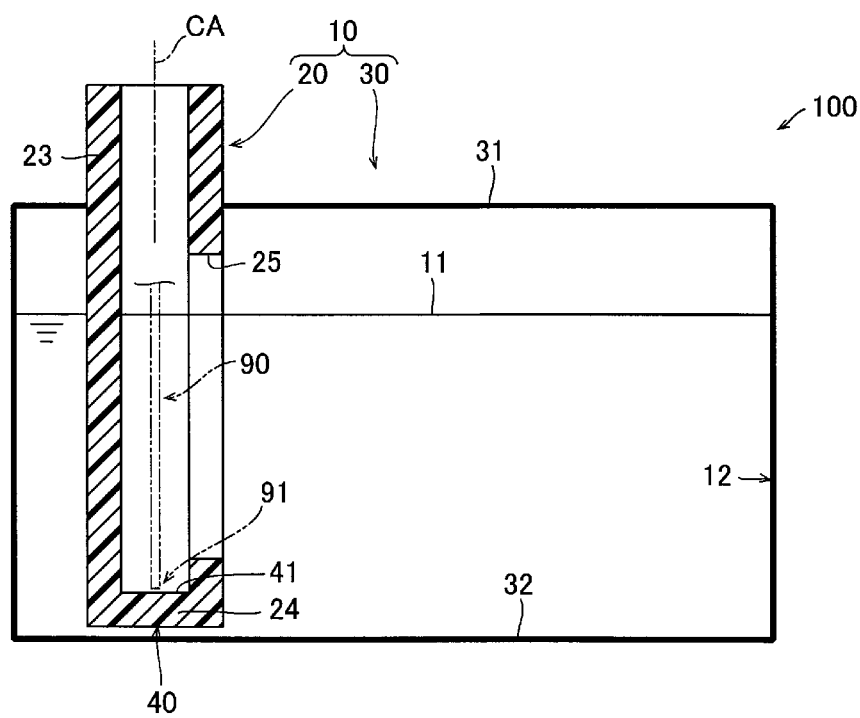
FIG. 4 is a schematic diagram illustrating a configuration example of the reagent container.

In the example illustrated in FIG. 4, the penetration prevention member 40 is integrally formed with the tubular member 20. As a result, it is possible to suppress an increase in the number of parts of the reagent container 100 even when the penetration prevention member 40 is provided. In addition, even if the flexible bag-shaped member 30 is provided, it is possible to suppress the positional relationship between the penetration prevention member 40 and the tubular member 20 from being displaced. Moreover, the bag-shaped member 30 can be easily joined as compared with the case where the penetration prevention member 40 and the tubular member 20 are provided separately.

In FIG. 4, the tubular member 20 has an opening at the upper end portion and not at the lower end portion. The penetration prevention member 40 constitutes a closed bottom portion 24 of the tubular member 20. As a result, the tip 91 of the aspiration tube 90 can be reliably received by the penetration prevention member 40 simply by inserting the aspiration tube 90 through the opening of the tubular member 20 and moving the aspiration tube 90 downward as it is.

The lower end portion of the tubular member 20 is arranged at a position near the inner bottom 32 of the bag-shaped member 30. The penetration prevention member 40 is provided to close the lower end portion of the tubular member 20 arranged at a position near the inner bottom 32 of the bag-shaped member 30. The penetration prevention member 40 is arranged inside the bag-shaped member 30 at an upper position away from the inner bottom 32 of the bag-shaped member 30. Even when the tip 91 of the aspiration tube 90 enters the opening of the tubular member 20 and moves as much as possible downward inside the tubular member 20, the tip 91 of the aspiration tube 90 is received by the penetration prevention member 40 before coming into contact with the bag-shaped member 30.

In the example of FIG. 4, instead of the opening formed at the lower end portion of the tubular member 20 in FIG. 1, a side opening 25 is formed on the side surface of the tubular member 20. That is, the tubular member 20 includes a tubular peripheral wall portion 23 with an opening formed at the upper end portion, and a side opening 25 that penetrates the peripheral wall portion 23 and communicates between the opening at the upper end portion of the tubular member 20 and the inside of the bag-shaped member 30. The bag-shaped member 30 is joined to the tubular member 20 at a position closer to the upper end portion than the side opening 25 in a state where the formed portion of the side opening 25 of the tubular member 20 is housed inside.

The reagent 11 in the bag-shaped member 30 can flow into the inside of the tubular member 20 through the side opening 25. The reagent 11 is aspirated inside the tubular member 20 with the tip 91 of the aspiration tube 90 arranged near the upper surface 41 of the penetration prevention member 40, that is, the bottom portion 24 of the tubular member 20. In this way, the tubular member 20 having the penetration prevention member 40 at the bottom portion can aspirate the reagent 11 in a state where the tip 91 of the aspiration tube 90 is arranged in the internal space of the tubular member 20.

In the example of FIG. 4, wince the penetration prevention member 40 is arranged above the inner bottom 32 of the bag-shaped member 30, the tip 91 of the aspiration tube 90 is also arranged above the inner bottom 32 of the bag-shaped member 30. Therefore, when the reagent 11 is aspirated to the maximum, a dead volume corresponding to the height from the inner bottom 32 to the upper surface 41 of the penetration prevention member 40 is generated.

Figure 5:
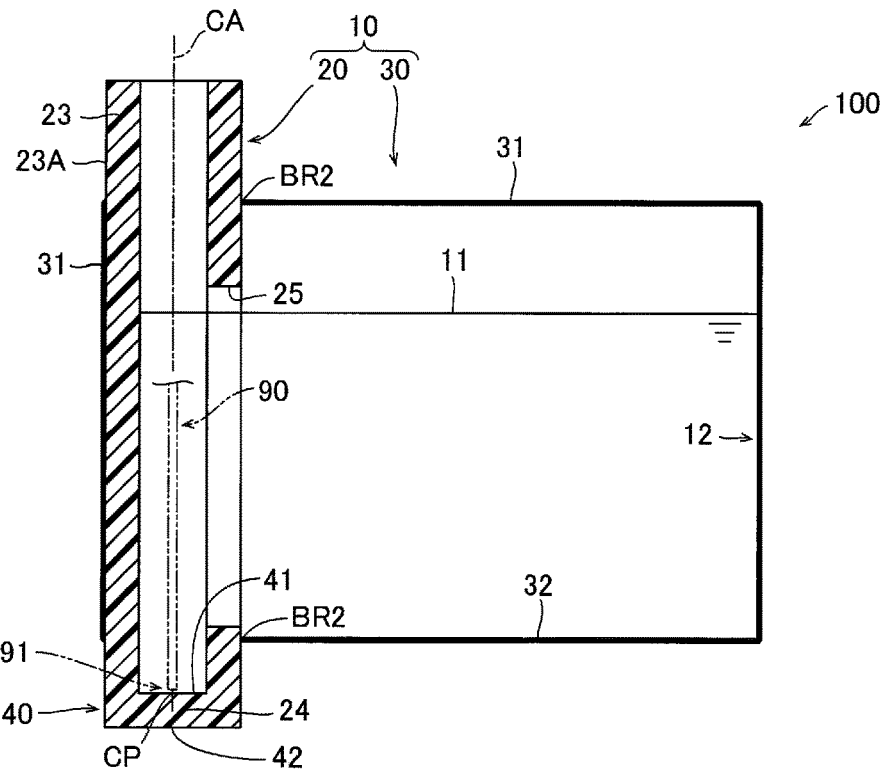
FIG. 5 is a schematic diagram illustrating another configuration example of the reagent container.

In light of the above, in the example illustrated in FIG. 5, the upper surface 41 of the penetration prevention member 40 is arranged at a position lower than the inner bottom 32 of the bag-shaped member 30. As a result, the tip 91 of the aspiration tube 90 can reach a position lower than the inner bottom 32 of the bag-shaped member 30 without coming into contact with the bag-shaped member 30. Therefore, the reagent 11 stored inside the bag-shaped member 30 can be easily collected up to the position of the upper surface 41 of the penetration prevention member 40. This makes it possible to reduce the dead volume of the reagent 11 even if the bag-shaped member 30 is joined to the tubular member 20 from the side.

In the example of FIG. 5, similarly to FIG. 4, the tubular member 20 includes a tubular peripheral wall portion 23 with an opening formed at the upper end portion, and a side opening 25 that penetrates the peripheral wall portion 23 and communicates between the opening at the upper end portion and the inside of the bag-shaped member 30. Plus, in the configuration example of FIG. 5, the bag-shaped member 30 is joined to the outer surface 23A of the peripheral wall portion 23 to cover the periphery of the side opening 25. That is, unlike FIG. 4 where the tubular member 20 is inserted into the bag-shaped member 30, FIG. 5 is such that the bag-shaped member 30 is joined to the tubular member 20 to project laterally from the outer peripheral surface (that is, the outer surface 23A) of the tubular member 20.

As a result, the bag-shaped member 30 is joined to the vertically extending tubular member 20 from the side. Therefore, when the aspiration tube 90 enters the inside of the tubular member 20, the tip 91 of the aspiration tube 90 is not arranged inside the bag-shaped member 30. Therefore, it is possible to more reliably prevent the tip 91 of the aspiration tube 90 from coming into contact with the bag-shaped member 30.

As described above, in the example of FIG. 5, the inner bottom 32 of the bag-shaped member 30 is arranged at a position off the lower side where the tip 91 of the aspiration tube 90 inserted through the opening of the tubular member 20 is arranged. The inner bottom 32 of the bag-shaped member 30 is arranged in a region other than the intersection CP between the central axis CA of the opening of the tubular member 20 and the inner surface 12 of the container body 10. The inner bottom 32 of the bag-shaped member 30 is arranged at a position of the outer surface 23A of the tubular member 20 and a position outside the outer surface 23A of the tubular member 20 in the radial direction.

In FIG. 5, the penetration prevention member 40 is provided to close the lower end portion of the peripheral wall portion 23. As a result, the tip 91 of the aspiration tube 90 can be reliably received by the penetration prevention member 40 simply by inserting the aspiration tube 90 through the opening of the tubular member 20 and moving the aspiration tube 90 downward as it is. In addition, even when the aspiration tube 90 enters in a tilted manner, the tip 91 of the aspiration tube 90 is guided by the inner surface of the peripheral wall portion 23, and the tip 91 can be prevented from coming into contact with the bag-shaped member 30. The lower surface portion 42 of the penetration prevention member 40 is the outer surface of the tubular member 20 and is exposed to the outside of the container body 10.

The upper joint region BR2 between the bag-shaped member 30 and the tubular member 20 is arranged at a position between the upper end portion of the side opening 25 and the opening (that is, the upper end portion of the tubular member 20). The lower joint region BR2 between the bag-shaped member 30 and the tubular member 20 is arranged at a position between the lower end portion of the side opening 25 and the penetration prevention member 40.

Therefore, in the example of FIG. 5, the upper end portion of the tubular member 20 protrudes higher than the bag-shaped member 30, and the lower end portion of the tubular member 20 protrudes toward a position lower than the bag-shaped member 30. The upper surface 41 of the penetration prevention member 40 is provided on the tubular member 20 to protrude toward a position lower than the inner bottom 32 of the bag-shaped member 30. The penetration prevention member 40 is arranged at the lowermost part of the container body 10.

In the example illustrated in FIG. 5, the inner bottom 32 of the bag-shaped member 30 extends laterally from the tubular member 20 in a direction orthogonal to the central axis CA of the tubular member 20. On the other hand, in the example illustrated in FIG. 6, the inner bottom 32 of the bag-shaped member 30 is inclined toward the tubular member 20 side and is connected to the lower end portion of the side opening 25.

This allows the reagent 11 in the bag-shaped member 30 to easily flow along the inclined inner bottom 32 to the upper surface 41 of the penetration prevention member 40. As a result, the dead volume of the reagent 11 can be reduced more effectively.

Figure 6:
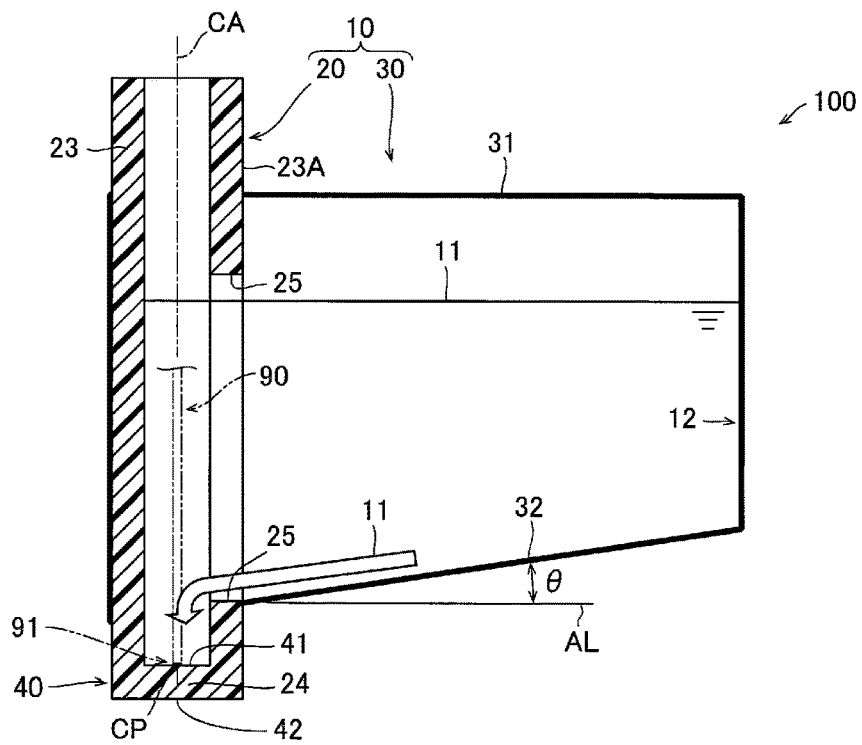
FIG. 6 is a schematic diagram illustrating a modified example of the reagent container of FIG. 5.

In FIG. 6, the lower side portion of the bag-shaped member 30 is inclined at an angle θ with respect to the upper side portion of the bag-shaped member 30. Note that the auxiliary line AL indicating the angle θ is a line parallel to the upper side portion of the bag-shaped member 30. The lower side portion of the bag-shaped member 30 is inclined toward the tubular member 20 side. As a result, the inner bottom 32 of the bag-shaped member 30 is inclined toward the tubular member 20 side. The inner bottom 32 of the bag-shaped member 30 is formed so that the position in the vertical direction at the end portion on the tubular member 20 side substantially coincides with the lower end portion of the side opening 25 of the tubular member 20. As a result, the inner bottom 32 of the bag-shaped member 30 is connected to the lower end portion of the side opening 25. The upper surface 41 of the penetration prevention member 40 is arranged at a position lower than the lower end portion of the side opening 25.

In FIG. 6, when the reagent 11 is aspirated from the tip 91 of the aspiration tube 90 arranged near the upper surface 41 of the penetration prevention member 40 and the amount of the reagent in the bag-shaped member 30 decreases, the action of gravity causes the reagent 11 to flow toward the side opening 25 side along the inclined inner bottom 32 (see the arrow in FIG. 6). Therefore, the reagent 11 remaining in the bag-shaped member 30 is reduced as much as possible.

In FIGS. 5 and 6, the penetration prevention member 40 is integrally formed with the tubular member 20 as the bottom portion 24 of the tubular member 20, but for example, the bottom portion 24 of the tubular member 20 may be configured as an opening, and the penetration prevention member 40 as a cap attached to close the opening at the bottom portion.

Specific Configuration Example of Reagent Container

A more specific configuration example of the reagent container 100 is described with reference to FIGS. 7 to 13. FIGS. 7 to 13 illustrate specific examples of the reagent container 100 employing the structure illustrated in FIG. 5.

Figure 7:
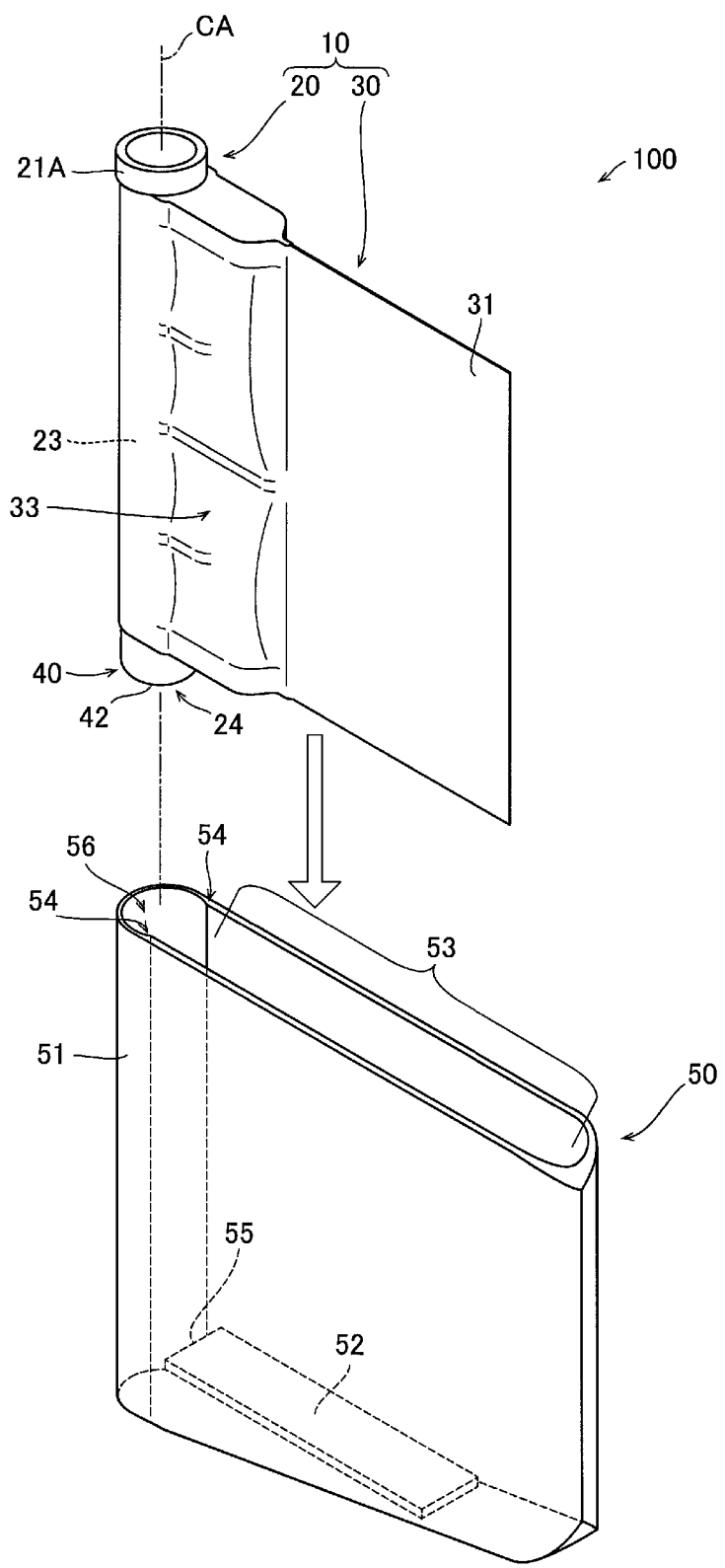
FIG. 7 is an exploded perspective diagram illustrating a specific configuration example of the reagent container.

As illustrated in FIG. 7, the reagent container 100 includes a container body 10 that includes a tubular member 20 and a bag-shaped member 30 joined to the tubular member 20 and storing the reagent 11. The penetration prevention member 40 is integrally formed with the tubular member 20 to close the lower end portion of the tubular member 20.

In the example of FIG. 7, the reagent container 100 includes a holding member 50 that holds the tubular member 20 at an upper position of the container body 10. Since the container body 10 has a structure in which the reagent 11 is stored in the flexible bag-shaped member 30, the bag-shaped member 30 is easily deformed when the container body 10 is installed alone. The holding member 50 has a function of determining the position of the tubular member 20 by supporting at least a part of the container body 10.

As a result, even when the reagent container 100 includes the flexible bag-shaped member 30, it is possible to stably hold the position of the tubular member 20 serving as the entrance/exit of the aspiration tube 90.

<Container Body>

Figure 8:
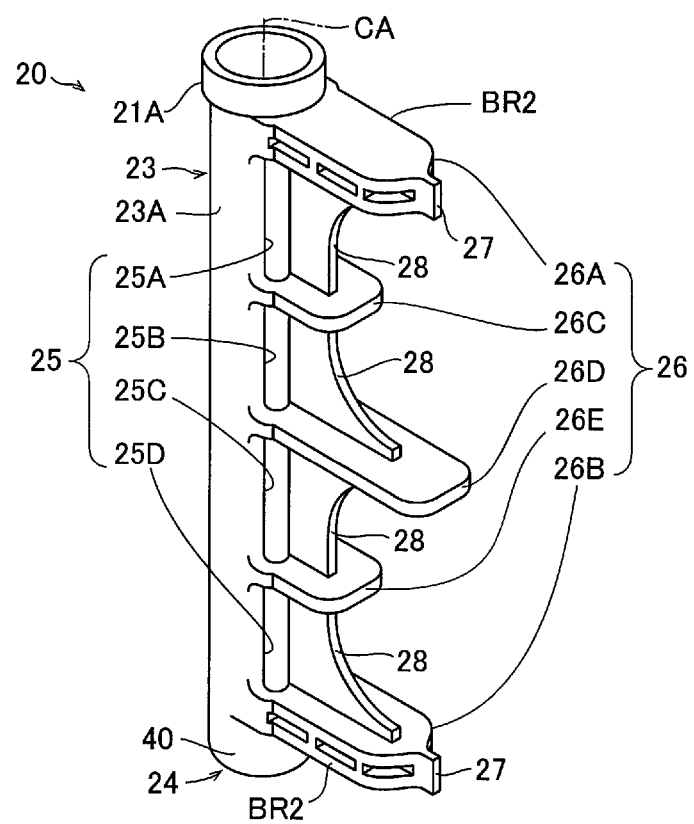
FIG. 8 is a perspective diagram illustrating a tubular member of the reagent container of FIG. 7.

As illustrated in FIG. 8, the tubular member 20 is, for example, a molded product made of polyethylene. The tubular member 20 includes a substantially cylindrical peripheral wall portion 23. The peripheral wall portion 23 has a circular outer shape when viewed from the direction in which the central axis CA extends. An opening is formed at the upper end portion of the peripheral wall portion 23. Note that a flange portion 21A projecting outward in the radial direction is formed at the upper end portion of the tubular member 20. The lower end portion of the peripheral wall portion 23 is closed by the penetration prevention member 40. The penetration prevention member 40 constitutes the bottom portion 24 of the tubular member 20. The tubular member 20 includes a cylindrical internal space partitioned by an inner peripheral surface of the tubular member 20 and an upper surface 41 (see FIG. 9) of the penetration prevention member 40, and the upper end portion of this internal space is opened to the outside of the tubular member 20 through the opening.

The tubular member 20 includes a side opening 25 that penetrates the peripheral wall portion 23 and opens laterally. The side opening 25 extends from the vicinity of the upper end portion to the vicinity of the lower end portion of the peripheral wall portion 23. The side opening 25 is formed between the protrusion 26A and the protrusion 26B to be described later.

The tubular member 20 includes a protrusion 26 that protrudes from the edge portion of the side opening 25 toward the inside of the bag-shaped member 30. The protrusion 26 protrudes from the outer peripheral surface of the peripheral wall portion 23 to the side orthogonal to the central axis CA of the tubular member 20. The protrusion 26 protrudes toward front of the side opening 25. Therefore, the protrusion 26 protrudes toward the inside of the bag-shaped member 30 (see FIG. 7) and is covered with the bag-shaped member 30. Here, when the bag-shaped member 30 is joined so that the bag-shaped member 30 is in close contact with the side opening 25, the volume of the bag-shaped member 30 is reduced. Therefore, according to the configuration including the protrusion 26, the bag-shaped member 30 can be joined in a state where the internal space of the bag-shaped member 30 is expanded by the protrusion 26, so that the volume of the bag-shaped member 30 can be stably secured.

The protrusion 26 is formed at the upper end portion and the lower end portion of the side opening 25. That is, the protrusion 26 includes a protrusion 26A formed at the upper end portion of the side opening 25 and a protrusion 26B formed at the lower end portion of the side opening 25.

The protrusion 26 is also provided at a position between the upper end portion and the lower end portion of the side opening 25. In the example of FIG. 8, a protrusion 26C, a protrusion 26D, and a protrusion 26E are provided between the upper end portion and the lower end portion of the side opening 25. A total of five protrusions 26A to 26E are arranged spaced apart from each other in the vertical direction. In the example of FIG. 8, the five protrusions 26A to 26E are arranged at positions at substantially equal intervals along the vertical direction. Each of the protrusions 26A to 26E has a flat plate shape.

The protrusion 26 is formed to connect one edge portion and the other edge portion in the width direction of the side opening 25. Specifically, as illustrated in FIG. 9B, the protrusion 26C, the protrusion 26D, and the protrusion 26E straddle and cross the side opening 25 to connect one edge portion and the other edge portion of the side opening 25. As a result, the protrusion 26 has a beam-like structure straddling both edge portions of the side opening 25. The side opening 25 formed in the tubular member 20 is divided into four small regions arranged in the vertical direction by the protrusion 26C, the protrusion 26D, and the protrusion 26E. Note that, in FIG. 9B, hatching is provided in the area of the side opening 25 for convenience of explanation.

As a result, the protrusion 26 functions as a reinforcing structure for the side opening 25, making it possible to improve the mechanical strength of the tubular member 20. As a result, when the bag-shaped member 30 is joined around the edge portion of the side opening 25, it is possible to suppress deformation of the tubular member 20 due to pressure. In addition, even if the aspiration tube 90 enters the tubular member 20 at an angle toward the side opening 25, the tip 91 of the aspiration tube 90 can be brought into contact with the protrusion 26. Therefore, it is possible to effectively suppress the tip 91 of the aspiration tube 90 from coming into contact with the bag-shaped member 30.

Moreover, in the examples of FIGS. 8 and 9, the tubular member 20 includes connecting portions 28 that connect the protrusions 26 adjacent to each other in the vertical direction. The connecting portions 28 are provided at four locations to connect the protrusion 26A and the protrusion 26C, the protrusion 26C and the protrusion 26D, the protrusion 26D and the protrusion 26D, and the protrusion 26E and the protrusion 26B. The connecting portions 28 extend along the vertical direction, which is the longitudinal direction of the side opening 25. The connecting portions 28 have a flat plate shape extending in the vertical direction. The connecting portions 28 connect the five protrusions 26A to 26E to each other to integrate them in a grid pattern, effectively improving the mechanical strength of the tubular member 20.

The connecting portions 28 are arranged at an intermediate position between one edge portion and the other edge portion of the side opening 25. For this reason, the connecting portions 28 are formed to divide the side opening 25 into a portion on one edge portion side and a portion on the other edge portion side. Therefore, as illustrated in FIG. 9B, since each of the four opening portions divided into four in the vertical direction by the protrusions 26C to 26E is further divided into two in the width direction by the connecting portion 28, the side opening 25 is divided into a total of eight opening portions 25A to 25H.

The width W2 of the protrusion 26A to protrusion 26E is substantially equal to or larger than the width W1 of the side opening 25. Therefore, as illustrated in FIG. 7, even when the reagent 11 is not contained in the bag-shaped member 30, a bulge 33 widened and bulged outward is formed in the formation region of the protrusions 26A to 26E. That is, formed in the bag-shaped member 30 is a hollow internal space in which the inner surfaces of the sheet-shaped member 31 are separated from each other by the protrusion 26. Since the bag-shaped member 30 is joined to the tubular member 20 in a state where the internal space is formed in advance, the internal volume that can store the reagent 11 is increased by that amount.

Further, as illustrated in FIG. 9A, the protrusion length L of the protrusion 26D located at the center of the side opening 25 in the vertical direction, among the protrusions 26A to 26E, is larger than the protrusion lengths of the other protrusions 26A, 26B, 26C, and 26E. This makes it possible to increase the internal space (that is, the volume of the reagent 11) of the bag-shaped member 30 in the bulge 33 (see FIG. 7) without making longer than necessary the protrusions 26A and 26B at both ends, where external force is likely to be applied.

In addition, the protrusion 26A at the upper end portion and the protrusion 26B at the lower end portion each form a joint region BR2 (see FIG. 8) serving as a boundary portion separating the inside and the outside of the container body 10. That is, the bag-shaped member 30 is joined along the outer peripheral surfaces of the protrusion 26A and the protrusion 26B. As a result, the tubular member 20 and the bag-shaped member 30 can be joined at the portion of the protrusion 26. Unlike the tubular member 20, the protrusion 26 does not need to have a hollow structure, so that deformation due to pressure at the time of joining can be effectively suppressed. As a result, the tubular member 20 and the bag-shaped member 30 can be joined more easily.

The protrusion 26A and the tip end portion 27 of the protrusion 26B have a tapered shape. Therefore, formation of a gap is avoided at the boundary portion from the location where the sheet-shaped members 31 of the bag-shaped member 30 are joined to each other to the location where the sheet-shaped member 31, the protrusion 26A, and the protrusion 26B are joined.

Figure 10:
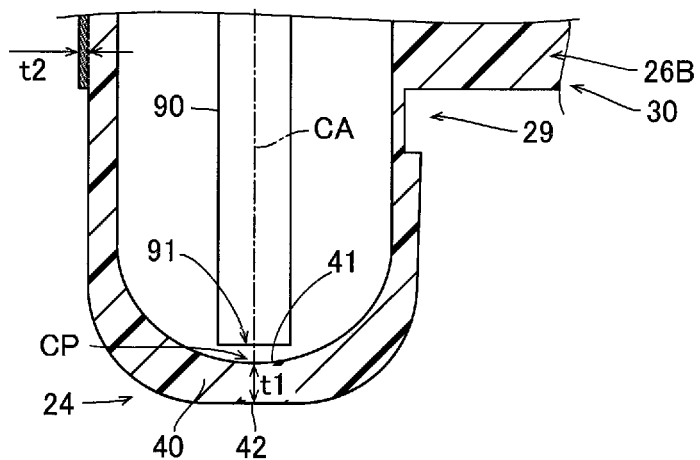
FIG. 10 is an enlarged cross-sectional diagram illustrating the periphery of a penetration prevention member.

As illustrated in FIG. 10, the penetration prevention member 40 at the lower end portion of the tubular member 20 has a rounded shape and is formed to protrude at a position lower than that of the bag-shaped member 30. The upper surface 41 of the penetration prevention member 40 is formed in a substantially spherical concave shape. The tubular member 20 including the penetration prevention member 40 is formed of, for example, polyethylene, and the thickness t1 of the penetration prevention member 40 is, for example, about 1 mm. A recessed portion 29 for engaging with the holding member 50 is formed on the outer surface of the peripheral wall portion 23 and at a position between the penetration prevention member 40 and the side opening 25. Specifically, the recessed portion 29 is formed to be adjacent to the lower side of the protrusion 26B.

As illustrated in FIG. 7, as an example of the sheet-shaped member 31, the bag-shaped member 30 is made up of a three-layer laminated structure film material (see FIG. 3) including (polyethylene/aluminum/nylon) from the inside. The bag-shaped member 30 is joined to the tubular member 20 when the inner polyethylene base material layer 31A is welded to the surface of the polyethylene tubular member 20. The gas barrier layer 31B is made of aluminum. A nylon protective layer 31C is formed on the surface side of the gas barrier layer 31B. The thickness t1 of the sheet-shaped member 31 is, for example, in the range of 100 μm or more and 200 μm or less. Therefore, the thickness t1 of the penetration prevention member 40 is larger than the thickness t2 of the bag-shaped member 30.

The bag-shaped member 30 is joined from the side to the tubular member 20 extending in the vertical direction. The bag-shaped member 30 is joined to the tubular member 20 to cover the side opening 25 inside. The upper end portion of the bag-shaped member 30 is joined along the outer periphery of the protrusion 26A (see FIG. 8) of the tubular member 20. The lower end portion of the bag-shaped member 30 is joined along the outer periphery of the protrusion 26B (see FIG. 8) of the tubular member 20. The bag-shaped member 30 is provided to store the protrusion 26C, the protrusion 26D, and the protrusion 26E (see FIG. 8). The bag-shaped member 30 is also joined to the outer peripheral surfaces of the protrusion 26C, the protrusion 26D, and the protrusion 26E.

In addition, the bag-shaped member 30 is joined so that the laminated film is wound around the outer surface of the peripheral wall portion 23. That is, the bag-shaped member 30 is joined to the tubular member 20 to cover the outer surface excluding the upper end portion of the tubular member 20 and the lower end portion of the tubular member 20. With these configurations, the internal space of the bag-shaped member 30 communicates only with the side opening 25 of the tubular member 20, and the side opening 25 communicates only with the opening at the upper end portion of the tubular member 20. Note that the flange portion 21A at the upper end portion of the tubular member 20 protrudes upward from the bag-shaped member 30. The upper surface 41 of the penetration prevention member 40 constituting the bottom portion 24 of the tubular member 20 protrudes at a position lower than the inner bottom 32 of the bag-shaped member 30.

Figure 13:
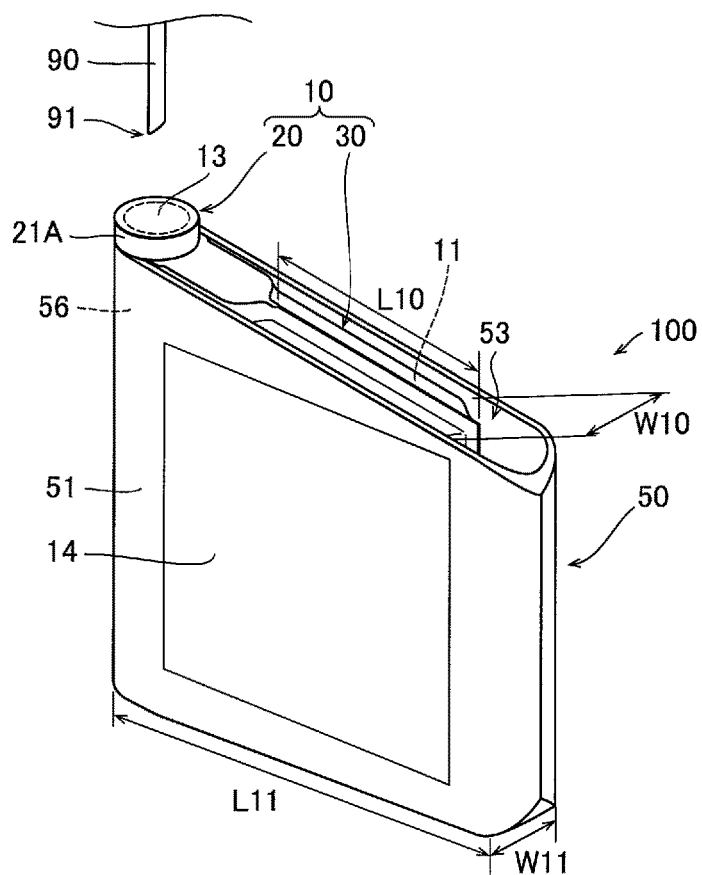
FIG. 13 is a diagram illustrating a reagent container in which a container body is held by a holding member.

In addition, as illustrated in FIG. 13, the container body 10 includes a sealing material 13 that seals the opening of the tubular member 20 and is puncturable by the aspiration tube 90.

This makes it possible to store the unused reagent 11 for a long time in a sealed state without the risk of erroneous opening. In addition, when the sealing material 13 for the opening of the tubular member 20 is punctured by the aspiration tube 90, a hard tube member having a sharp tip 91 is employed for the aspiration tube 90, so that the bag-shaped member 30 is easily damaged. On the other hand, in the present embodiment, since the penetration prevention member 40 of the container body 10 can receive the sharp tip 91, it is possible to particularly effectively suppress damage to the bag-shaped member 30.

The sealing material 13 is made of, for example, a laminated film with a gas barrier property and a light-shielding property, and is welded to the upper end portion of the tubular member 20 to cover the opening at the upper end portion of the tubular member 20. The laminated film constituting the sealing material 13 may be the same as the laminated film constituting the bag-shaped member 30, but may be different. Preferably, the sealing material 13 has a property of being easily broken as compared with the bag-shaped member 30. As a result, the sealing material 13 can be easily punctured by the tip 91 of the aspiration tube 90. As an example, the sealing material 13 is made up of a four-layer laminated structure film material including (polyethylene/aluminum/polyethylene/PET) from the inside. PET as a protective layer has the property of being harder and less stretchable than, for example, nylon of the sheet-shaped member 31 constituting the bag-shaped member 30. Therefore, the sealing material 13 is more easily punctured than the sheet-shaped member 31.

<Holding Member>

The holding member 50 illustrated in FIG. 7 is configured as a case for storing the container body 10. The holding member 50 is made of a material that is less likely to be deformed than the bag-shaped member 30. The holding member 50 is, for example, a molded product made of a resin material. The resin material is, for example, polyethylene.

The holding member 50 includes a peripheral wall 51 formed with an open upper portion to surround the periphery of the container body 10, and a bottom surface portion 52 formed at the bottom portion of the peripheral wall 51. The holding member 50 stores and holds the container body 10 by inserting the container body 10 into the peripheral wall 51 from the open upper part.

The holding member 50 includes a support portion 53 that supports the bag-shaped member 30. This makes it possible to stably hold the posture of the reagent container 100 even when the reagent container 100 includes the flexible bag-shaped member 30.

The support portion 53 includes an inner peripheral surface of the peripheral wall 51 and an upper surface of the bottom surface portion 52. The inner peripheral surface of the peripheral wall 51 supports the periphery of the bag-shaped member 30, and the bag-shaped member 30 is mounted on the bottom surface portion 52, so that the lower end portion of the bag-shaped member 30 is supported by the bottom surface portion 52.

The holding member 50 includes a first engaging portion 54 that engages with the container body 10 to determine the position of the opening of the tubular member 20, and a second engaging portion 55 that engages with the container body 10 to determine the position of the penetration prevention member 40.

This allows the first engaging portion 54 to determine the position of the opening of the tubular member 20 serving as the entrance/exit of the aspiration tube 90, and allows the second engaging portion 55 to determine the position of the penetration prevention member 40 that receives the tip 91 of the aspiration tube 90. Therefore, since the penetration prevention member 40 can more reliably receive the tip 91 of the aspiration tube 90, it is possible to effectively suppress the aspiration tube 90 from coming into contact with the bag-shaped member 30.

Figure 11:
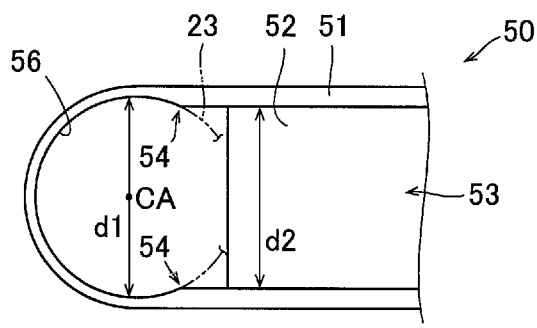
FIG. 11 is an enlarged top diagram illustrating a first engaging portion of a holding member.

As illustrated in FIG. 11, the first engaging portion 54 includes an inner peripheral surface of the peripheral wall 51. Specifically, the peripheral wall 51 includes an insertion portion 56 having a substantially cylindrical shape with an inner diameter d1 corresponding to the outer shape of the tubular member 20. In addition, in the portion of the support portion 53 on the outer side of the insertion portion 56, the distance d2 between the inner peripheral surfaces of the peripheral wall 51 is formed to be smaller than the inner diameter d1. The first engaging portion 54 includes an edge portion at the boundary between the insertion portion 56 and the support portion 53. Therefore, when the tubular member 20 of the container body 10 is inserted into the insertion portion 56, the first engaging portion 54 determines the position of the opening of the tubular member 20 with respect to the holding member 50 in the horizontal direction. In addition, the first engaging portion 54 restricts the movement of the tubular member 20 toward the support portion 53. The first engaging portion 54 also has a function of guiding the tubular member 20 so that the tubular member 20 is inserted straight into the insertion portion 56 without being inclined.

Figure 12:
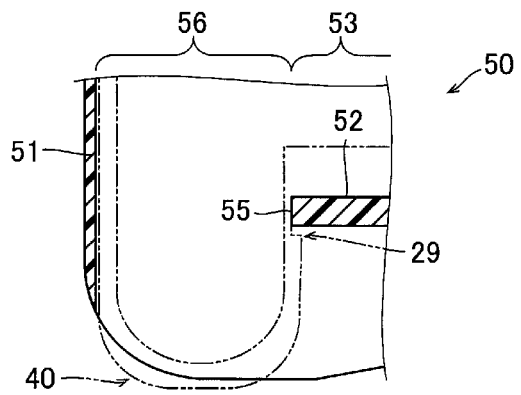
FIG. 12 is an enlarged cross-sectional diagram illustrating a second engaging portion of the holding member.

As illustrated in FIG. 12, the second engaging portion 55 includes the end portion of the bottom surface portion 52. The bottom surface portion 52 extends from the region of the support portion 53 to the insertion portion 56 in which the tubular member 20 is arranged, and the second engaging portion 55 is formed at a position adjacent to the insertion portion 56. When the tubular member 20 is inserted into the insertion portion 56, the penetration prevention member 40 at the bottom portion of the tubular member 20 passes through the second engaging portion 55 and is arranged at a position lower than the bottom surface portion 52. Then, the second engaging portion 55 engages with the tubular member 20 by fitting into the recessed portion 29 (see FIG. 10) formed in the vicinity of the penetration prevention member 40. As a result, the position of the penetration prevention member 40 with respect to the holding member 50 in the vertical direction is determined. When the holding member 50 storing the container body 10 is installed in the analyzer 200, the second engaging portion 55 makes it possible to mechanically position the depth position of the penetration prevention member 40 in the reagent container 100 (that is, the insertion depth of the aspiration tube 90). Note that the second engaging portion 55 and the recessed portion 29 form a snap-fit type engaging structure. The second engaging portion 55 also functions as a retaining portion that locks the container body 10 from the holding member 50 by fitting it into the recessed portion 29 to prevent accidental pullout.

At the time of manufacturing the reagent container 100, first, the tubular member 20 and the bag-shaped member 30 are joined by heat welding to form the container body 10. A predetermined amount of reagent 11 is injected into the container body 10, and the air inside is removed or replaced with an inert gas. Then, the sealing material 13 is joined by heat welding to the opening at the upper end portion of the tubular member 20, sealing the internal reagent 11. Then, the container body 10 is inserted into the holding member 50, and the tubular member 20 is engaged with the first engaging portion 54 and the second engaging portion 55 to be fixed to the holding member 50.

As illustrated in FIG. 13, the configuration storing the container body 10 in the case-shaped holding member 50 can include a reagent identification member 14, such as an RFID or a display label storing information about a drug, attached to the outer surface of the holding member 50.

Note that the volume of the reagent 11 in the reagent container 100 is arbitrary. The shapes of the bag-shaped member 30 and the holding member 50 of the reagent container 100 can be appropriately changed according to the volume of the reagent 11 that can be stored.

Figure 14:
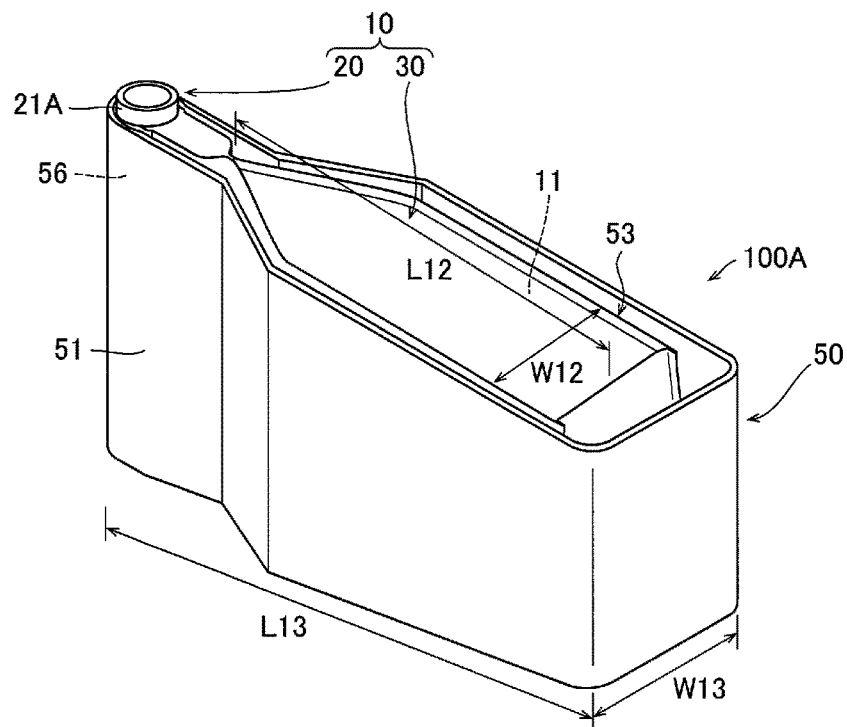
FIG. 14 is a perspective diagram illustrating an example of a large reagent container having a different reagent volume from that of FIG. 7.

For example, FIG. 14 illustrates an example of a large-capacity type reagent container 100A having a capacity larger than that of the reagent container 100 illustrated in FIGS. 7 to 13. In the reagent container 100A, the shape of the tubular member 20 is the same as that of the example of FIG. 13 (length L10), but the length L12 of the bag-shaped member 30 is larger. In addition, the width W12 of the bag-shaped member 30 is enlarged from the middle, and is larger than the example (width W10) of FIG. 13. Similarly, in the holding member 50 of the reagent container 100A, the shape in the vicinity of the insertion portion 56 into which the tubular member 20 is inserted is the same as that of FIG. 13, but the shape of the support portion 53 of the holding member 50 is deformed according to the bag-shaped member 30. The support portion 53 of the reagent container 100A has a length L13 larger than that of the example of FIG. 13 (length L11), and the width W13 of the support portion 53 is enlarged from the middle, and is larger than the example of FIG. 13 (width W11).

(Explanation of Analyzer)

Next, a configuration example of the analyzer 200 that uses the reagent container 100 is described with reference to FIG. 15.

Figure 15:
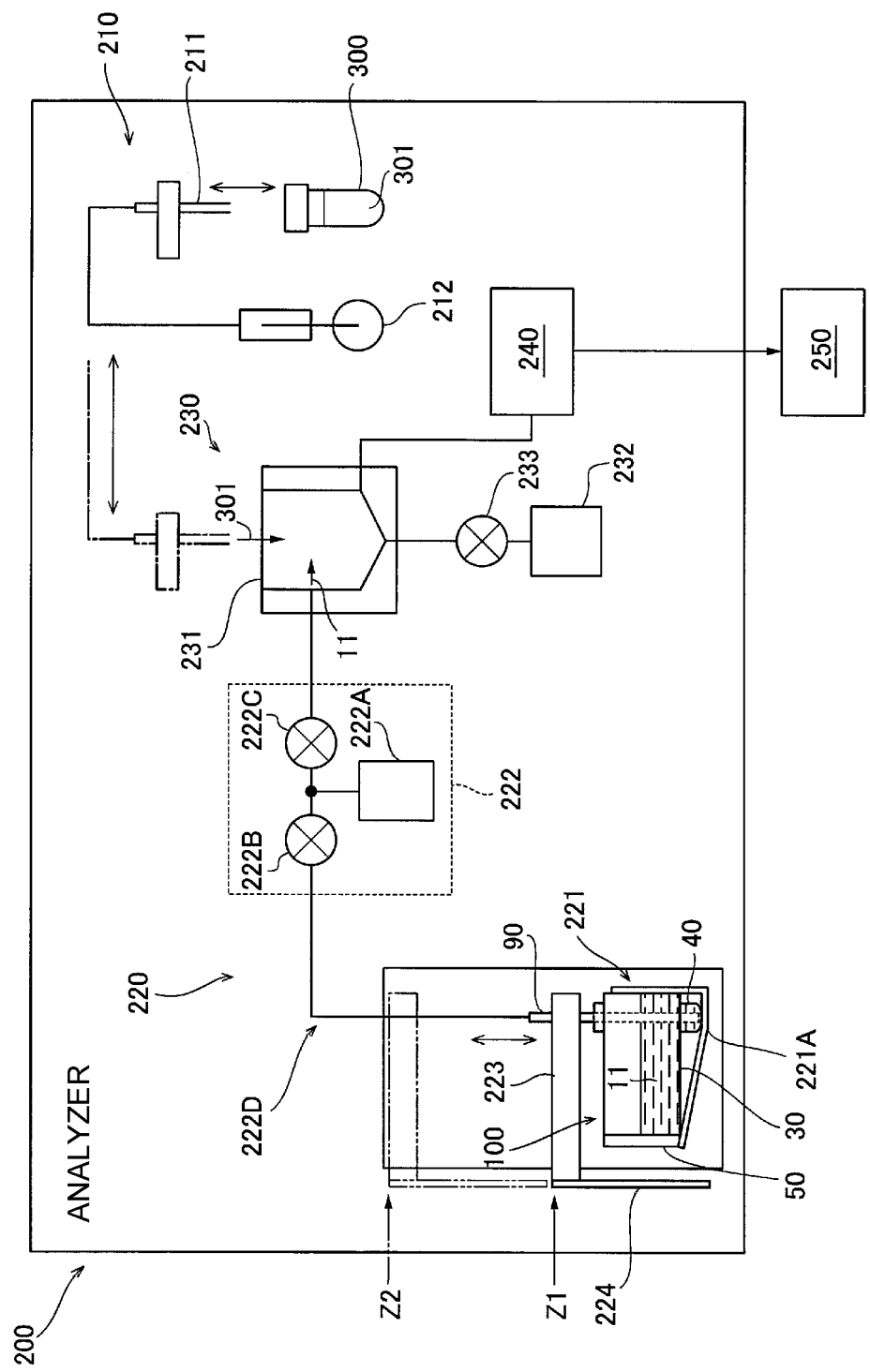
FIG. 15 is a schematic diagram illustrating an example of an analyzer.
Figure 16:
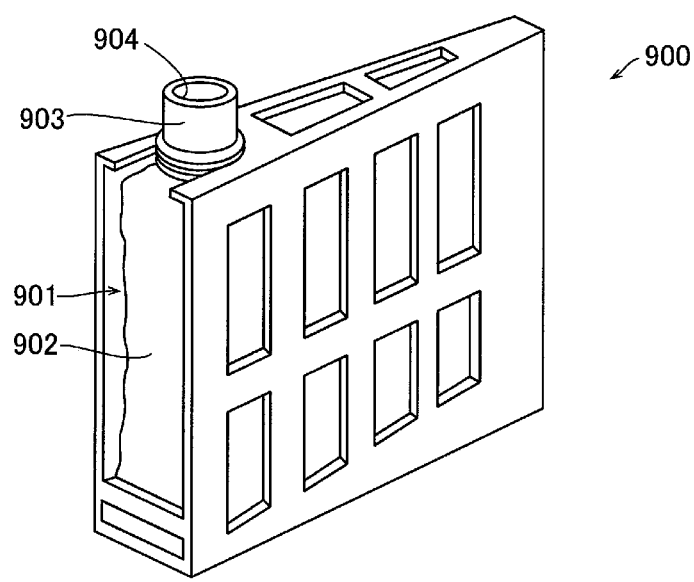
FIG. 16 is a diagram illustrating a related art.

The analyzer 200 illustrated in FIG. 15 is a blood cell counter. The blood cell counter is a device that measures a blood sample using the reagent 11 and detects cells such as blood cells and solid components contained in the blood sample.

The analyzer 200 includes a sample aspirator 210 that aspirates blood being a sample 301 from a sample container (test tube) 300, a reagent aspirator 220 that aspirates the reagent 11 from the reagent container 100, a specimen preparation unit 230 that prepares a measurement specimen using the aspirated sample 301 and reagent 11, and a detection unit 240 that detects a test substance from the measurement specimen prepared by the specimen preparation unit 230. The analyzer 200 is communicably connected to the control device 250 that analyzes the measurement results.

The sample aspirator 210 includes an aspiration tube 211 through which the sample passes, and a quantification unit 212. The sample aspirator 210 aspirates the sample from the sample container 300 by the aspiration tube 211 and the quantification unit 212. The quantification unit 212 includes a syringe pump and the like connected to the aspiration tube 211. The sample aspirator 210 supplies a predetermined amount of sample required for sample measurement to the reaction chamber 231 of the specimen preparation unit 230 by the quantification unit 212.

The reagent aspirator 220 is provided inside the analyzer 200, and includes a container storage unit 221 in which the reagent container 100 is installed, an aspiration tube 90, and a quantification unit 222. Multiple sets of the container storage unit 221, the aspiration tube 90, and the quantification unit 222 may be provided so that multiple reagent containers 100 can be installed in order to supply different reagents 11 for each measurement item of the sample.

The container storage unit 221 can store the reagent container 100, and is configured to hold the stored reagent container 100 in a predetermined position and a predetermined posture. The container storage unit 221 includes a reagent placement unit 221A configured to position and support the reagent container 100 in contact with the lower surface, the front surface on which the tubular member 20 is arranged, and both side surfaces of the reagent container 100. The reagent container 100 is installed on the reagent placement unit 221A by the user.

The aspiration tube 90 is made of a hard material of stainless steel, and the tip 91 is formed in a sharp shape so that the sealing material 13 of the reagent container 100 can be punctured (that is, penetrated). The aspiration tube 90 is arranged at a position directly above the opening of the reagent container 100 installed in the container storage unit 221 so that the tip 91 faces downward, and is attached to an aspiration tube holder 223 that can move up and down. The aspiration tube holder 223 is configured to move up and down in conjunction with a cover 224 that covers the inlet of the container storage unit 221. The cover 224 is configured to be movable in the vertical direction, and can be moved to a closed position Z1 that covers the inlet of the container storage unit 221 and an open position Z2 that opens the inlet of the container storage unit 221.

When installing the reagent container 100, the user moves the cover 224 upward to the opening position Z2 to open the inlet of the container storage unit 221. The user installs the reagent container 100 (or the reagent container 100A) in the opened container storage unit 221. The reagent container 100 is supported by the reagent placement unit 221A at a position where an opening is arranged directly below the aspiration tube 90. After installing the reagent container 100, the user moves the cover 224 downward to the closing position Z1 to close the inlet of the container storage unit 221. At this time, the aspiration tube 90 moves downward in conjunction with the downward movement of the cover 224, and the tip 91 of the aspiration tube 90 penetrates the sealing material 13 and enters the inside of the reagent container 100 through the opening.

The quantification unit 222 includes a pump 222A including a syringe pump, a diaphragm pump, and the like, electromagnetic valves 222B and 222C for switching the transfer path of the aspirated reagent 11, and a flow path 222D. By opening the electromagnetic valve 222B and aspirating the pump 222A, the reagent 11 is quantitatively aspirated from the inside of the reagent container 100 through the aspiration tube 90 and the flow path 222D. By opening the electromagnetic valve 222C and discharging the pump 222A, the quantified reagent 11 is transferred to the reaction chamber 231 through the flow path 222D.

The specimen preparation unit 230 includes a reaction chamber 231. The reaction chamber 231 is configured to mix the sample (blood) 301 aspirated by the sample aspirator 210 and the reagent 11 supplied from the reagent aspirator 220. Multiple reaction chambers 231 may be provided depending on the number of measurement items. The reaction chamber 231 is supplied with the reagent 11 according to the measurement item, and a measurement specimen according to the measurement item is prepared by mixing the sample 301 and the reagent 11. Then, the prepared measurement specimen is supplied to the detection unit 240. The excess measurement specimen is discharged to the waste liquid chamber 232 by opening the valve 233. The reagent 11 contains a staining solution for specifically staining specific type of particles or cells in a biological sample such as blood, urine, or body fluid. Body fluid may be any one of cerebrospinal fluid, thoracic fluid, abdominal fluid, fluid of the cardiac sac, synovial fluid, dialysate from peritoneal dialysis, and intraperitoneal rinse. The staining solution contains, for example, at least one fluorescent dye for staining cells. The fluorescent dye may be fluorescent dye for staining at least one of white blood cells, red blood cells, reticulocytes, nucleated red blood cells, organelles, platelets, and other blood cells in blood. The fluorescent dye may be fluorescent dye for staining white blood cells, red blood cells, bacteria, epithelial cells and other formed elements in urine. The fluorescent dye may be fluorescent dye for staining white blood cells, red blood cells, epithelial cells, and other cells in body fluid.

The detection unit 240 detects blood cell components contained in a blood sample. The detection unit 240 classifies and detects the stained blood cell components contained in the measurement specimen by a flow cytometry method using a semiconductor laser. In addition, the detection result obtained by the detection unit 240 is transmitted to the control device 250 as measurement data (measurement result) of the sample.

The detection unit 240 causes particles such as cells to flow into the flow of the sheath liquid formed in the flow path portion, irradiates the flowing particles with laser light from the light transmitting unit, and detects scattered light and fluorescence by the light receiving unit. The control device 250 analyzes individual particles based on the light detected by the detection unit 240. For example, a scattergram that combines scattered light intensity and fluorescence intensity as parameters is created, and the specimen is analyzed based on the distribution and the like of the scattergram. Measurement items by the flow cytometry method include NEUT (neutrophil), LYMPH (lymphocyte), MONO (monocyte), EO (eosinophil), BASO (basophil) and the like.

In addition, the detection unit 240 performs detection by, for example, a sheath flow DC detection method. That is, the detection unit 240 detects an electrical change between a flow path portion provided with an opening portion through which a specimen flows and a pair of electrodes arranged to face each other with the opening portion in between. The detection unit 240 causes particles such as cells to flow in the flow of the sheath liquid passing through the opening portion, and causes a direct current to flow between the electrodes. The detection unit 240 detects individual particles based on the pulsed current change as the particles pass through the opening portion. Measurement items by the sheath flow DC detection method include WBC (white blood cell) count, RBC (hemoglobin) count, HGB (hemoglobin amount), HCT (hematocrit value), MCV (mean corpuscular volume), MCH (mean corpuscular hemoglobin), MCHC (mean corpuscular hemoglobin concentration), PLT (platelet count), and the like.

Other Examples of Analyzers

Here, an example has been provided in which the analyzer 200 is a blood cell counter, but the present invention is not limited to this. The analyzer 200 may be any device that measures a sample using the reagent 11. The reagent 11 contains components according to the measurement principle of the sample by the analyzer 200, and is not limited to the staining solution.

<Coagulation Analyzer>

The analyzer 200 can be, for example, a blood coagulation analyzer that performs blood coagulation analysis. In this case, the sample is plasma or serum isolated from blood. The analyzer 200 analyzes the sample using a coagulation method, a synthetic substrate method, immunonephelometry, and/or an agglutination method.

In the coagulation method, the measurement specimen is irradiated with light to measure the coagulation time of converting fibrinogen in the sample to fibrin based on the electric signal of the transmitted light or scattered light from the specimen. As the reagent 11, a coagulation reagent containing a coagulation factor is used. Measurement items of the coagulation method include PT (prothrombin time), APTT (activated partial thromboplastin time), Fbg (fibrinogen amount), and the like.

In the synthetic substrate method, the measurement specimen is irradiated with light to measure the degree of color development due to the action of the chromogenic synthetic substrate with respect to the enzyme in the measurement specimen based on the electric signal of the transmitted light from the specimen. The reagent 11 contains a chromogenic synthetic substrate. Measurement items of the synthetic substrate method include ATIII (antithrombin III), α2-PI (α2-plasmin inhibitor), PLG (plasminogen), and the like.

In immunonephelometry, an antibody-sensitizing reagent that causes an antigen-antibody reaction against coagulation-fibrinolytic factors in the sample is added to the sample, and the substance contained in the reagent 11 agglutinates as a result of the antigen-antibody reaction. The reagent 11 is an antibody-sensitizing reagent. In immunonephelometry, the measurement specimen is irradiated with light to measure the agglutination rate of the reagent-containing substance in the measurement specimen based on the electric signal of the transmitted light or scattered light from the specimen. Measurement items of immunonephelometry include D-dimer, FDP (fibrin degradation product), and the like.

In the agglutination method, the measurement specimen is irradiated with light to measure the change in absorbance in the process of agglutination of platelets and the like in the measurement specimen based on the electric signal of the transmitted light from the specimen. The reagent 11 contains a substance that induces a platelet agglutination reaction or immobilized platelets. Measurement items of the agglutination method include vWF:RCo (von Willebrand Ristocetin Cofactor), platelet agglutination ability, and the like.

The analyzer 200 can be, for example, a blood coagulation analyzer that performs blood coagulation analysis. In this case, the sample is plasma or serum isolated from blood. The analyzer 200 analyzes the sample using a coagulation method, a synthetic substrate method, immunonephelometry, or an agglutination method. The control device 250 analyzes the sample based on the detected light.

<Immunoassay Device>

In addition, for example, the analyzer 200 may be an immunoassay device. The analyzer 200 detects the target component by using the antigen-antibody reaction between the target component in blood and the component in the reagent. As a target component, for example, an antigen or antibody, a protein, a peptide, or the like contained in blood is detected. The immunoassay device acquires serum or plasma as a sample, and quantitatively or qualitatively measures an antigen or antibody contained in the sample. Note that the antigen-antibody reaction includes not only a reaction between an antigen and an antibody but also a reaction using a specific binding substance such as an aptamer. Aptamers are nucleic acid molecules or peptides synthesized to specifically bind to a particular substance.

The analyzer 200 measures the light generated from the specimen, that is, the chemiluminescence based on the test substance contained in the sample. The analyzer 200 generates measurement data based on the light detected by the detection unit. The reagent 11 may include a reagent containing a component that specifically binds to the target component to form an immune complex, a reagent containing a simple substance of an immune complex, a reagent containing a labeling substance, an enzyme reagent for generating chemical luminescence, and the like.

Here, chemiluminescence is light emitted by utilizing energy generated by a chemical reaction. Chemiluminescence is, for example, light emitted when a molecule is excited by a chemical reaction to an excited state and returns from the excited state to the ground state. The chemiluminescence detected by the detection unit is, for example, based on chemiluminescence enzyme immunoassay (CLEIA), and is the light generated by the reaction between the enzyme and the substrate. Measurement items of chemiluminescence enzyme immunoassay include HBsAb, FT3, FT4, TSH, and the like.

Note that the chemiluminescence detected by the detection unit may be, for example, light based on chemiluminescence immunoassay (CLIA), electrochemiluminescence immunoassay (ECLIA), fluorescence enzyme immunoassay (FEIA method), LOCI method (Luminescent Oxygen Channeling Immunoassay), BLEIA method (bioluminescent enzyme immunoassay), and the like.

According to one or more embodiments described above, a reagent container is provided capable of suppressing the tip of the aspiration tube from penetrating the container body due to contact with the tip of the aspiration tube of the analyzer.

Note that the embodiments disclosed herein are exemplary in all respects and are not considered to be restrictive. The scope of the present invention is shown by the scope of claims rather than the description of the above-described embodiment, and further includes all modifications within the meaning and scope equivalent to the scope of claims.

The invention claimed is:

1. A reagent container installed in an analyzer for use, and that stores a reagent supplied to the analyzer via an aspiration tube, the reagent container comprising:

a container body comprising
- a tubular member with an opening into which the aspiration tube is inserted from above, and
- a bag-shaped member joined to the tubular member and storing the reagent, wherein the container body comprises a penetration prevention member that prevents a tip of the aspiration tube inserted through the opening from penetrating the container body, the tubular member includes a tubular peripheral wall portion with the opening positioned at an upper end portion, and a side opening that penetrates the peripheral wall portion and communicates between the opening and an inside of the bag-shaped member, and the bag-shaped member is joined to an outer surface of the peripheral wall portion to cover a periphery of the side opening.

2. The reagent container according to claim 1, wherein the penetration prevention member has a thickness larger than that of the bag-shaped member.

3. The reagent container according to claim 1, wherein the penetration prevention member comprises a material harder than the bag-shaped member.

4. The reagent container according to claim 1, wherein the penetration prevention member comprises a resin material with a density higher than that of the bag-shaped member.

5. The reagent container according to claim 1, wherein the container body comprises the penetration prevention member in a bottom portion region including an intersection between a central axis of the opening of the tubular member and an inner surface of the container body.

6. The reagent container according to claim 1, wherein an upper surface of the penetration prevention member is positioned at a position lower than an inner bottom of the bag-shaped member.

7. The reagent container according to claim 1, wherein the penetration prevention member is integrally formed with the tubular member.

8. The reagent container according to claim 7, wherein the penetration prevention member constitutes a closed bottom portion of the tubular member.

9. A reagent container installed in an analyzer for use, and that stores a reagent supplied to the analyzer via an aspiration tube, the reagent container comprising:

a container body comprising
- a tubular member with an opening into which the aspiration tube is inserted from above, and
- a bag-shaped member joined to the tubular member and storing the reagent, wherein the container body comprises a penetration prevention member that prevents a tip of the aspiration tube inserted through the opening from penetrating the container body, and the reagent container further comprises a holding member that includes a first engaging portion that engages with the container body to position the tubular member and the opening, and a second engaging portion that engages with the container body to position the penetration prevention member.

10. The reagent container according to claim 1, wherein the penetration prevention member is provided to close a lower end portion of the peripheral wall portion.

11. The reagent container according to claim 10, wherein an upper surface of the penetration prevention member is arranged at a position lower than an inner bottom of the bag-shaped member.

12. The reagent container according to claim 11, wherein the inner bottom of the bag-shaped member is inclined toward the tubular member side and is connected to a lower end portion of the side opening.

13. The reagent container according to claim 1, wherein the tubular member includes a protrusion that protrudes from an edge portion of the side opening toward the inside of the bag-shaped member.

14. The reagent container according to claim 13, wherein the protrusion is positioned to connect one edge portion and the other edge portion in a width direction of the side opening.

15. The reagent container according to claim 14, wherein
the protrusion is positioned at each of an upper end portion and a lower end portion of the side opening, and
the bag-shaped member is joined along an outer peripheral surface of the protrusion.

16. The reagent container according to claim 1, further comprising: a holding member that holds the tubular member at an upper position of the container body.

17. The reagent container according to claim 16, wherein the holding member comprises a support portion that supports the bag-shaped member.

18. The reagent container according to claim 16, wherein the holding member comprises a reagent identification member on an outer surface thereof.

19. The reagent container according to claim 9, wherein
the tubular member includes a tubular peripheral wall portion with the opening positioned at an upper end portion, and a side opening that penetrates the peripheral wall portion and communicates between the opening and an inside of the bag-shaped member, and the bag-shaped member is joined to an outer surface of the peripheral wall portion to cover a periphery of the side opening.

\* \* \* \* \*